(12) United States Patent
Martin et al.

(10) Patent No.: US 10,291,772 B2
(45) Date of Patent: May 14, 2019

(54) TELEPHONY COMMUNICATIONS SYSTEM FOR DETECTING ABUSE IN A PUBLIC TELEPHONE NETWORK

(71) Applicant: Deutsche Telekom AG, Bonn (DE)

(72) Inventors: Tobias Martin, Rabenau (DE); Gerald Lumma, Darmstadt (DE); Ulrike Weber, Bensheim (DE); Dieter Wuest, Waldems (DE); Soenke Gruetzmacher, Willich (DE)

(73) Assignee: DEUTSCHE TELEKON AG, Bonn (DE)

( * ) Notice: Subject to any disclaimer, the term of this patent is extended or adjusted under 35 U.S.C. 154(b) by 90 days.

(21) Appl. No.: 15/475,215

(22) Filed: Mar. 31, 2017

(65) Prior Publication Data

US 2017/0289347 A1    Oct. 5, 2017

(30) Foreign Application Priority Data

Apr. 1, 2016    (DE) .......................... 10 2016 106 018

(51) Int. Cl.
*H04L 12/26*    (2006.01)
*H04M 3/42*    (2006.01)
(Continued)

(52) U.S. Cl.
CPC ....... *H04M 3/2281* (2013.01); *H04M 7/0078* (2013.01); *H04M 2201/18* (2013.01);
(Continued)

(58) Field of Classification Search
None
See application file for complete search history.

(56) References Cited

U.S. PATENT DOCUMENTS 6,047,174 A * 4/2000 Frederick .............. H04W 12/12
379/145
7,099,444 B1 * 8/2006 Russell .................. H04M 3/38
379/142.02
(Continued)

FOREIGN PATENT DOCUMENTS

CN    104936182 A    9/2015

*Primary Examiner* — Harry S Hong
(74) *Attorney, Agent, or Firm* — Leydig, Voit & Mayer, Ltd.

(57) ABSTRACT

A telephony communications system for detecting abuse in a public telephone network to which a telephone network subscriber is connected includes: a telephone system server, configured to: emulate an extension subscriber in order to simulate the existence of the emulated extension subscriber of the telephone system vis-à-vis an attacking entity, receive a control command from the attacking entity to establish a telephone connection between the emulated extension subscriber and the telephone network subscriber, and send a connection request to the telephone network subscriber in response to receiving the control command in order to initiate the establishment of the telephone connection between the emulated extension subscriber and the telephone network subscriber; and a telephone network abuse detection device configured to detect an abuse attempt in the public telephone network on the basis of the telephone network address of the telephone network subscriber.

16 Claims, 4 Drawing Sheets

(51) Int. Cl.
*H04M 3/436* (2006.01)
*H04M 7/00* (2006.01)
*H04W 12/12* (2009.01)
*H04M 3/22* (2006.01)

(52) U.S. Cl.
CPC ............... *H04M 2203/6027* (2013.01); *H04Q 2213/13139* (2013.01)

(56) References Cited

U.S. PATENT DOCUMENTS

| | | |
|---|---|---|
| 2007/0036314 A1 | 2/2007 | Kloberdans et al. |
| 2008/0084975 A1 | 4/2008 | Schwartz |
| 2012/0167208 A1* | 6/2012 | Buford ................ H04L 63/1491 726/22 |
| 2014/0376705 A1 | 12/2014 | Layman et al. |
| 2017/0195353 A1* | 7/2017 | Taylor ..................... H04L 67/22 |

* cited by examiner

TELEPHONY COMMUNICATIONS SYSTEM FOR DETECTING ABUSE IN A PUBLIC TELEPHONE NETWORK

CROSS-REFERENCE TO RELATED APPLICATIONS

Priority is claimed to German Patent Application No. DE 10 2016 106 018.6, filed on Apr. 1, 2016, the entire disclosure of which is hereby incorporated by reference herein.

FIELD

The present invention relates to the field of detecting interference and abuse in public telephone networks, in particular pattern-based abuse detection in hacked Private Branch Exchange (PBX) systems in a public telephone network.

BACKGROUND

Telephone system hacking (PBX hacking) refers to an abuse method that leads to damages in the telecommunications industry of up to USD 5 billion globally every year (see Communications Fraud Control Association (CFCA), Worldwide Telecom Fraud Survey, 2013). In this type of hacking, the perpetrators (hackers or fraudsters) gain unauthorized access to a telecommunications system, usually business customers' private bank exchanges or internet routers having telephone functions, in order to tamper with these PBX systems and generate telephone calls fraudulently, mostly to international numbers. This tampering involves setting up call forwarding to international destinations, exploiting routing functions of voice mailboxes, or setting up additional extensions that the perpetrator can use.

The perpetrators use the telephone systems they have tampered with to generate huge amounts of traffic to international destination numbers, from which they generate a revenue share. This is referred to as International Revenue Share Fraud (IRSF). These IRSF destination numbers can be international premium-rate numbers which provide the perpetrators with a direct revenue share from incoming telephone calls.

In many cases, hackers also use numbers or number lanes in countries having very high call termination charges. The call termination charge is payable when an international telephone call is terminated by an interexchange carrier in the network of a local exchange operator. Owing to high operating costs, foreign local exchange operators, for example in small Pacific Island states or sparsely populated countries, charge particularly high termination charges. Criminal organizations act as carriers in the international telecoms industry, and purport to terminate phone calls to these countries at low prices. In reality, however, the traffic is not terminated, but instead the termination charges are retained. Since the traffic has often been artificially generated by PBX system hacking, the "caller" often does not realize that no termination has taken place. This type of traffic is often described as short-stopping.

Telecoms providers therefore have a significant interest in the early detection and prevention of such artificially generated phone traffic from compromised telephone systems. To detect this fraudulently generated traffic, most telecoms providers operate abuse detection systems, which process the traffic data, detect artificially generated traffic or mass traffic using preconfigured rules, and alert the operator. Most of these abuse detection systems function in a rule-based manner.

In a rule-based abuse detection system, the number of calls and traffic minutes to particular international destination numbers and/or the charges incurred therefor are counted over a particular period of time. If one or more of these parameters exceeds a threshold configured in the rule, an alarm is triggered. Subsequently, the suspected abuse is usually checked manually. Other measures can then be taken, such as informing the affected customer or blocking the line for foreign calls.

However, the disadvantage of this detection method using threshold-based rules is that a certain amount of damages has to be incurred first before the threshold is reached and the alarm is triggered. Therefore, the traffic generated fraudulently before the threshold is reached leads to a certain amount of "base damages", which have to be borne by the telecoms service provider and/or its affected customers. Higher damages are only prevented by detecting abuse and taking counter-measures. In addition, this method leads to the risk that the hackers systematically seek to stay below the threshold and still generate artificial traffic over a longer period of time.

However, the abuse detection system administrator cannot set the thresholds too low because this runs the risk of false alarms. In particular, data-protection rules on data reduction and data economy and the secrecy of telecommunications dictate that the thresholds not be set too low, so as to prevent normal telecoms traffic triggering an alarm in the system.

Another counter-measure against IRSF widely used in the telecoms industry is the blocking of already flagged IRSF destination number lanes, i.e. numbers and blocks of numbers that have already been used in the past for artificially generated traffic by hacked PBX systems. These flagged destination numbers or B-numbers are also referred to as "Hot B Numbers" and the corresponding lists as "Hot B Number Lists". As a precautionary measure, a PBX service provider can block the destination numbers or number lanes originating from the Hot B Number Lists, such that international calls can no longer be made to these destinations and no more termination charges can be fraudulently generated either.

However, the risk with these blocks on Hot B Numbers is that numbers from legitimate foreign telecoms subscribers may also be inadvertently blocked. Some perpetrators seeking to take revenue shares from international termination charges also use number ranges that are actually assigned to legitimate subscribers. For example, the perpetrators generate traffic to these destinations from hacked PBX systems while at the same time preventing regular traffic to said destinations. The legitimate subscribers can then temporarily not be reached by phone. This is also referred to as "number hijacking". If the numbers or number lanes are then blocked by telecoms providers in order to prevent IRSF, the subscribers in question can no longer be called, which may lead to complaints to the telecoms providers.

Another disadvantage of the block is that telecoms providers generally do not know how long the perpetrators will use the numbers or number lanes to generate termination charges. Typically, the numbers are only abused for a limited period of time, and the perpetrators regularly change the numbers or number ranges to be abused. Therefore, the number blocks also have to be lifted after a certain period of time. If this is done too early, additional damages may be incurred; if this is done too late, the block lists may become too large and exceed the capacity in the network elements.

There is therefore a great need for devices and methods for detecting abuse in telephone networks that both enable particularly rapid detection of abuse attempts in order to prevent costs being incurred, and prevent the numbers of legitimate telecoms subscribers being erroneously or inadvertently blocked.

SUMMARY

In an exemplary embodiment, the present invention provides a telephony communications system for detecting abuse in a public telephone network to which a telephone network subscriber is connected. The telephony communications system includes: a telephone system server, configured to: emulate an extension subscriber of a telephone system in the public telephone network in order to simulate the existence of the emulated extension subscriber of the telephone system vis-à-vis an attacking entity, receive a control command from the attacking entity to establish a telephone connection between the emulated extension subscriber and the telephone network subscriber in the public telephone network, and send a connection request to the telephone network subscriber in response to receiving the control command in order to initiate the establishment of the telephone connection between the emulated extension subscriber and the telephone network subscriber, wherein the connection request includes a telephone network address of the telephone network subscriber in the public telephone network; and a telephone network abuse detection device, configured to receive the telephone network address of the telephone network subscriber from the telephone system server, and detect an abuse attempt in the public telephone network on the basis of the telephone network address of the telephone network subscriber.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
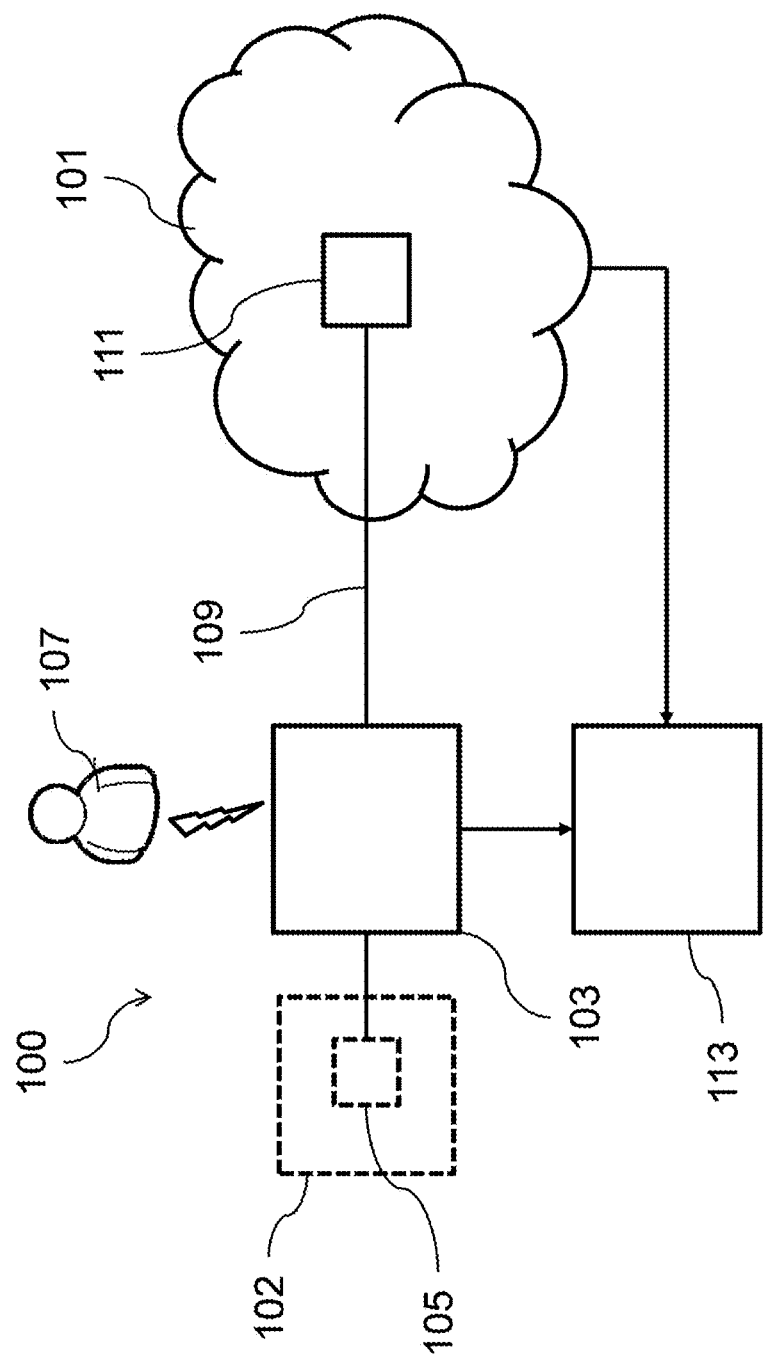
FIG. 1 is a schematic view of a telephone communications system for detecting abuse in a public telephone network according to an embodiment.

Exemplary embodiments of the present invention provide for analyzing traffic data from telephone connections in a public telephone network, and for detecting abuse attempts, in particular International Revenue Share Fraud, and interference in the public telephone network.

The methods and systems set out below can take various forms. The individually described elements can be implemented using hardware or software components, for example electronic components that can be produced by various technologies, including, for example, semiconductor chips, application-specific integrated circuits (ASICs), microprocessors, digital signal processors, integrated electrical circuits, electro-optical circuits and/or passive modules.

According to a first aspect, the invention relates to a telephony communications system for detecting abuse in a public telephone network to which a telephone network subscriber is connected, comprising a telephone system server designed to emulate an extension subscriber of a telephone system in the public telephone network in order to simulate the existence of the emulated extension subscriber of the telephone system vis-à-vis an attacking entity, the telephone system server being designed to receive a control command from the attacking entity to establish a telephone connection between the emulated extension subscriber and the telephone network subscriber in the public telephone network, the telephone system server being designed to send a connection request to the telephone network subscriber in response to receiving the control command in order to initiate the establishment of the telephone connection between the emulated extension subscriber and the telephone network subscriber, the connection request including a telephone network address of the telephone network subscriber in the public telephone network, and said communications system comprising a telephone network abuse detection device, the telephone system server being designed to transmit the telephone network address of the telephone network subscriber to the telephone network abuse detection device, the telephone network abuse detection device being designed to detect a abuse attempt in the public telephone network, in particular in a subscriber network of the public telephone network, on the basis of the transmitted telephone network address of the telephone network subscriber. This creates the advantage whereby telephone network addresses of telephone network subscribers used by attackers can be detected effectively. On the basis of these telephone network addresses, abuse in the public telephone network can be detected, as can repeated attacks or abuse attempts. Detecting abuse or of abuse attempts in the public telephone network can involve the detection of interference or attempts to interfere in the public telephone network.

The telephone system server can be connected to the public telephone network as a second telephone network subscriber or as a telephone system. The telephone system server can be designed to emulate the extension subscriber of the telephone system, in particular to emulate acting as an extension subscriber of a telephone system. In this regard, the telephone system server can emulate the extension subscriber and the associated telephone system of the extension subscriber. The telephone system server can emulate the telephone system as a telephone system connected to the public telephone network. In addition, the telephone system server can itself be designed as a telephone system, and can itself form the telephone system of the emulated extension subscriber. Emulating the extension subscriber and/or the telephone system by the telephone system server can involve the telephone system server reproducing, in particular virtually reproducing, or simulating the extension subscriber and/or the telephone system.

The telephone system server can comprise or form a telephone system decoy system, a telephone system honeypot or a PBX honeypot. The telephone system server can also comprise an IP telephone system, in particular a Voice over IP telephone system, or an IP PBX based on the open-source software Asterisk or different Voice over IP telephone system software. The telephone system server can be connected to the internet and/or to a telephone network, and can be designed to receive control commands for establishing telephone connections to telephone network subscribers in the public telephone network via the internet and/or the telephone network.

The telephone system server can be connected to the public telephone network or a subscriber network of a telephone network operator via a subscriber connection line. The telephone system server can also be connected to the public telephone network via a system connection, for example a primary multiplexer connection or a Session Initiation Protocol (SIP) trunk. The system connection of the telephone system server can be designed as an "all IP connection", for example and internet connection having Voice over IP. Furthermore, the telephone system server can comprise an internet connection and a separate telephone connection, for example an Integrated Services Digital Network (ISDN) connection or a primary multiplexer connection, via which the outgoing telephone connections can be sent into the public network.

The telephone system server can comprise a memory for storing the telephone network addresses and a processor for controlling the emulation of the extension subscriber. The processor can also be designed to process the control command from the attacking entity and to initiate the establishment of the connection.

The attacking entity can be an attacker, a hacker or a fraudster, or an entity used by an attacker, a hacker or a fraudster, for example a server or computer. The attacking entity can locate the telephone system server via the internet or the telephone network, and can actuate said server using control commands for establishing telephone connections. The attacking entity can also actuate the telephone system server via the telephone network using control commands, in particular when the telephone system server comprises an ISDN connection. To do so, the attacking entity for example calls the direct dial number of an extension in order to be connected to the voice mailbox. The attacking entity then attempts to control the voice mailbox via the telephone line by for example inputting dual tone multi frequency (DTMF) control commands, in order to abuse said mailbox to establish an outgoing voice call ("call-through"). The telephone system server can be designed to emulate a voice mailbox on the direct dial numbers of the emulated extension in order to allow the attacking entity to communicate control commands via the emulated voice mailbox.

The control commands communicated by the attacking entity can include an identifier of the emulated extension subscriber, in particular an extension number of the emulated extension subscriber, a password of the emulated extension subscriber and the telephone network address of the telephone network subscriber. The control commands can further comprise the IP address of the attacking entity. Alternatively, the telephone system server can be designed to capture and store the IP address of the attacking entity. The telephone system server can also be designed to capture the telephone network address of the telephone network subscriber, in particular upon receipt of the control command and/or upon sending of the connection request.

For example, the attacking entity sends a multiplicity of control commands to the telephone system server in order to guess the extension number and the password of the emulated extension subscriber. The telephone system server can be designed to emulate the emulated extension subscriber using a particularly easy to guess password, such as "123456", and a particularly short or obvious extension number, in order to increase the likelihood of a successful attack, and at the same time to simulate a telephone system having surmountable security measures that is believable from the perspective of the attacking entity.

The telephone network address of the telephone network subscriber can comprise a telephone number or a calling or destination number, or a Session Initiation Protocol Uniform Resource Identifier (SIP-URI) of the telephone network subscriber in the public telephone network. The telephone number can include an area code, in particular a country code. The telephone system server can be designed to only initiate the establishment of the connection when the telephone number is preceded by a code digit, e.g. "0". In order to guess the correct digit, the attacking entity may thus send a multiplicity of control commands containing telephone numbers of the telephone network subscriber to the telephone system server, each containing different preselected code digits.

The telephone network subscriber can be a first telephone network subscriber in the telephone network to which other telephone network subscribers in the public telephone network can send connection requests. The telephone network subscriber is, for example, another telephone system, in particular a telephone system having an IRSF destination number, or a mobile phone. The mobile phone can be in the attacker's possession. The attacking entity can send a connection request to the mobile phone as a test, in particular to test code digits or to test whether the telephone system server permits a call to a telephone number having a foreign country code. The telephone network subscriber can also be a virtual telephone network subscriber or an emulated telephone network subscriber generated, for example, by a server connected to the public telephone network. The telephone network address of the telephone network subscriber can be a premium-rate number for which the attacker earns a revenue share.

The public telephone network can comprise lines in various countries or geographic regions. For example, the telephone network subscriber is connected to the public telephone network in a different country from the telephone system server. The public telephone network can also be divided into telephone networks of different telephone network operators, or can comprise a multiplicity of telephone networks of different telephone network operators. The public telephone network can also comprise a plurality of subscriber or connection networks. The telephone system server is connected for example to one subscriber network of a subscriber network operator, and the telephone network subscriber is for example connected to another subscriber network of a different subscriber network operator. The subscriber network and the other subscriber network can be connected via a connection network.

The telephony communication system can be designed to detect abuse in a subscriber network of the public telephone network. In particular, the telephone network abuse detection device can be designed to detect abuse attempts in a subscriber network of the public telephone network.

In the event that a telephone connection is established between the emulated extension subscriber and the telephone network subscriber, the telephone system server can be designed to capture and store traffic data of the telephone connection, for example a duration of the telephone connection.

According to an embodiment, the telephony communications system comprises a connection control device, the connection control device being connected between the telephone system server and the public telephone network, the connection control device being designed to receive the connection request from the telephone system server and to relay said request to the telephone network subscriber in the public telephone network in order to establish the telephone connection. This creates the advantage whereby the telephone connection between the emulated extension subscriber and the telephone network subscriber can be established effectively via the connection control device.

The connection control device can comprise a Voice over IP gateway and/or a SIP proxy, in particular a SIP proxy server. The connection control device can connect the telephone system server to the public telephone network. The connection control device can be designed as a module for controlling calls and connections, or can comprise a module for controlling calls and connections.

According to an embodiment, the connection control device is designed to compare the telephone network address of the telephone network subscriber with telephone network addresses in a dynamic reference list, in particular a dynamic blacklist, before relaying the connection request, the connection control device being designed to not relay the connection request if the telephone network address is included in the dynamic reference list. This creates the advantage whereby a connection can only be established to as yet unknown telephone network subscribers used by attackers. The attacking entity may thus be prompted to send control commands for establishing connections to as yet unknown telephone network subscribers, thus making it possible to capture telephone network addresses of as many as yet unknown telephone network subscribers used by attackers as possible.

According to an embodiment, the connection control device is designed to store the telephone network address of the telephone network subscriber in the dynamic reference after relaying the connection request. This creates the advantage whereby a connection can only be established to as yet unknown telephone network subscribers used by attackers.

According to an embodiment, the connection control device is designed to break the established telephone connection between the emulated extension subscriber and the telephone network subscriber after a predefined period of time. This creates the advantage whereby it is possible to avoid the high costs resulting from a long telephone connection to an IRSF destination number.

According to an embodiment, the telephone system server is designed to store the connection request, in particular the telephone network address of the telephone network subscriber, and/or the associated control command in a look-up table. This creates the advantage whereby the data of the connection request can be ordered or sorted through in order to be analyzed or visualized. The connection request can include signaling data.

The telephone system server can be designed to capture a network address of the attacking entity, in particular an IP address of the attacking entity, and to store said address in the look-up table. The telephone system server can also be designed to store the traffic data of the telephone connection, for example a duration of the telephone connection, in the look-up table if the telephone connection to the telephone network subscriber is established. The look-up table can form a database.

According to an embodiment, the telephone system server comprises a visualization apparatus for visualizing the look-up table. The telephone system server can be actuated via a computer in order to access and visualize the look-up table, for example via a data visualization plug-in such as Kibana. In the process, the look-up table can be scanned or sorted through via a search engine or a search server such as Elasticsearch.

According to an embodiment, the telephone system server is designed to transmit telephone network addresses, in particular the telephone network address of the telephone network subscriber, stored in the look-up table, to the telephone network abuse detection device on the basis of an adjustable transmission rule. This creates the advantage whereby abuse in the public telephone network can be detected effectively on the basis of telephone network addresses of the telephone network subscribers used by attacking entities.

The transmission rule can establish that only telephone network addresses having foreign destination numbers are transmitted. Transmitting the telephone network addresses can involve exporting the telephone network addresses.

According to an embodiment, the telephone network abuse detection device comprises a memory for storing the telephone network address of the telephone network subscriber, in particular in a greylist stored in the memory. This creates the advantage whereby the telephone network abuse detection device can refer effectively to telephone network addresses collected or captured by the telephone system server. The memory can be integrated in the telephone network abuse detection device. The memory can also be an external memory, for example a server memory, to which the telephone network abuse detection device is connected for communication, in order to access the greylist. The greylist can contain a multiplicity of telephone network addresses collected or captured by the telephone system server.

According to an embodiment, the telephone network abuse detection device is designed to process signaling data from other telephone network subscribers in the public telephone network, in particular from other telephone network subscribers in a subscriber network of the public telephone network, the signaling data comprising telephone network addresses of connection requests from the other telephone network subscribers, the telephone network abuse detection device being designed to compare the telephone network addresses in the signaling data with telephone network addresses stored in the memory in order to detect connection requests from the other telephone subscribers in the public telephone network to telephone network subscribers whose telephone network addresses are stored in the memory. This creates the advantages whereby attacks on telephone network subscribers in the public telephone network can be detected effectively.

The subscribers in the public telephone network can be telephone systems, in particular telephone systems having an internet connection, private bank exchanges or Voice over IP routers. The telephone network addresses in the memory can be telephone network addresses that have been previously captured by the telephone system server and communicated to the telephone network abuse detection device. The telephone network addresses can thus be assigned to known telephone network subscribers, in particular the telephone network subscriber, that have already been used previously for attacks, in particular as destinations for the connection requests initiated by the attacking entities.

Processing the signaling data by the telephone network abuse device can involve receiving the signaling data from the public telephone network, in particular from subscribers in a subscriber network of the public telephone network, and analyzing this signaling data, in particular comparing the telephone network addresses in the signaling data with telephone network addresses stored in the memory.

According to an embodiment, the telephone network abuse detection device is designed to emit an alert signal on the basis of a filter rule upon detection of connection requests from the other telephone network subscribers in the public telephone network to telephone network subscribers whose telephone network addresses are stored in the memory. This creates the advantage whereby attacked subscribers can be alerted effectively.

The alert signal can include an abuse alert to the telephone network operator or telephone network subscriber that sends the connection requests to the telephone network subscriber used by the attacking entity, or to the telephone network operator and the telephone network subscriber. An advantageous design of the filter rule can reduce the risk of erroneously emitting the alert message.

According to an embodiment, the filter rule includes a plurality of conditions, in particular detecting a predefined number of connection requests to one or more telephone network subscribers whose telephone network addresses are stored in the memory, and detecting connection requests to a predefined number of different telephone network subscribers whose telephone network addresses are stored in the memory, the telephone network abuse detection device being designed to emit the alert signal in response to a plurality of filter rule conditions being met by another telephone network subscriber in the public telephone network, in particular in a subscriber network of the public telephone network. This creates the advantage whereby the risk of erroneously emitting the alert message can be reduced. The other telephone network subscriber in the public telephone network can be a telephone network subscriber in a subscriber network to which the telephone network abuse detection device is assigned.

The filter rule specifies, for example, that an alert signal is only emitted to a telephone network subscriber if the telephone network subscriber makes 20 attempts to dial destination numbers on the greylist within four hours, dials at least four different destination numbers on the greylist, and dials destination numbers on the greylist in at least three different destination countries.

In addition, a plurality of filter rules or filters can be linked together. For example, a list containing "test numbers" dialed by the attackers before the actual IRSF destination can act as a pre-filter, and another list containing "IRSF destinations" can act as the main filter. Alternatively, a filter rule based on the greylist can be linked to another filter rule based on a threshold.

According to an embodiment, the telephony communications system comprises a storage device connected between the telephone system server and the telephone network abuse detection device, the storage device being designed to cache the telephone network address of the telephone network subscriber in order to process the data in a database before transmitting it to the telephone network abuse detection device.

The storage device can be a memory, in particular a server memory or a network memory, in which the database is stored. The storage device can be designed to send cached telephone network addresses to the telephone network abuse detection device following data processing, in particular in the form of the greylist.

According to an embodiment, the storage device is designed to collate telephone network addresses cached in the database in relation to one feature of the telephone network addresses, in particular a digit sequence of the telephone network addresses, and to transmit the collated telephone network addresses to the telephone network abuse detection device. This creates the advantage whereby grouping the telephone network addresses together make it possible to reduce the number of telephone network addresses separately transmitted to the telephone network abuse detection device.

The storage device can be designed to combine telephone network addresses having consecutive numbers so as to form number lanes. Via this combination, the number of numbers stored in the telephone network abuse detection device can be reduced.

According to an embodiment, the storage device is designed to store telephone network addresses in the database together with a time stamp, the time stamp indicating the time at which the connection request associated with the telephone network address was sent by the attacking entity. This creates the advantage whereby telephone network addresses currently used by attacking entities can be distinguished from obsolete telephone network addresses and from ones that may no longer be being used.

According to an embodiment, the storage device is designed to erase double telephone network addresses, in particular telephone network addresses having different notation but the same recipient, so as to avoid duplicates.

According to an embodiment, the storage device is designed to transmit telephone network addresses cached in the database to the telephone network abuse detection device at regular intervals, and to delete the telephone network addresses from the database after a predefined period of time. This creates the advantage whereby obsolete telephone network addresses or those no longer being used can be deleted from the storage device and thus the memory space requirements in the storage device can be reduced.

According to an embodiment, the telephone system service can be connected to a communications network, in particular the internet, via a communications interface, the telephone system server being designed to receive the control command for establishing the telephone connection between the emulated extension subscriber and the telephone network subscriber via the communications interface. This creates the advantage whereby the attacking entity can effectively send control commands for establishing the telephone connection to the telephone system server, in particular the PBX honeypot.

According to a second aspect, the invention relates to a method for detecting abuse in a public telephone network to which a telephone network subscriber is connected, comprising emulating an extension subscriber of a telephone system in the public telephone network having a telephone system server in order to simulate the existence of the emulated extension subscriber of the telephone system vis-à-vis an attacking entity, receiving a control command from the attacking entity for establishing a telephone connection between the emulated extension subscriber and the telephone network subscriber in the public telephone network, sending a connection request to the telephone network subscriber in response to receiving the control command in order to initiate the establishment of the telephone connection between the emulated extension subscriber and the telephone network subscriber, the connection request including a telephone network address of the telephone network subscriber, transmitting the telephone network address of the telephone network subscriber to a telephone network abuse detection device, and detecting an abuse attempt in the public telephone network, in particular in a subscriber network of the public telephone network, on the basis of the transmitted telephone network address of the telephone network subscriber. This creates the advantage whereby telephone network addresses of telephone network subscribers used by attackers can be captured effectively. On the basis of these telephone network addresses, abuse can be detected in the telephone network, as can repeated attacks or abuse attempts.

The invention can be implemented in software and/or hardware.

In the following detailed description, reference will be made to the accompanying drawings, which form part of the description and show specific embodiments for illustration purposes. It goes without saying that other embodiments can also be used and structural or logical modifications can be made, without departing from the concept behind the present invention. Therefore, the following detailed description should not be taken to be limiting. It also goes without saying that the features of the various embodiments described herein can be combined with other another, unless explicitly specified otherwise.

The aspects and embodiments are described with reference to the drawings, with like reference numerals generally denoting like elements. In the following description, numerous specific details are presented for explanatory purposes, in order to provide a thorough understanding of one or more elements of the invention. However, it may be obvious for a person skilled in the art that one or more aspects or embodiments can be implemented without adhering so much to the specific details. In other cases, known structures and elements are shown schematically to make it easier to describe one or more aspects or embodiments. It goes without saying that other embodiments can be used and structural or logical modifications can be made, without departing from the concept behind the present invention.

Even though a particular feature or a particular aspect of an embodiment may have been disclosed in relation to only one of several implementations, a feature or aspect of this kind can also be combined with one or more other features or aspects of the other implementations, as may be desirable or advantageous for a given or particular application. Furthermore, where the expressions "contain", "have", "having" or other variants are used in either the detailed description or the claims, they should also be taken to have a similar meaning to "comprise". The expressions "coupled" and "connected" may have been used together with deviations therefrom. It goes without saying that expressions of this kind are used to indicate that two elements cooperate or interact with each other regardless of whether they are in direct physical or electrical contact or are not in direct contact with one another. Furthermore, the expression "by way of example" is merely meant to indicate an example, not the best or optimum option. The following description should therefore not be taken to be limiting.

FIG. 1 is a schematic view of a telephony communications system 100 for detecting abuse in a public telephone network 101 according to an embodiment, a telephone network subscriber 111 being connected to the public telephone network 101.

The telephony communications system 100 comprises a telephone system server 103 that is connected to the public telephone network 101 and is designed to emulate an extension subscriber 105 of a telephone system 102 in the public telephone network 101 in order to simulate the existence of the emulated extension subscriber 105 vis-à-vis an attacking entity 107, the telephone system server 103 being designed to receive a control command from the attacking entity 107 for establishing a telephone connection 109 between the emulated extension subscriber 105 and the telephone network subscriber 111 in the public telephone network 101, the telephone system server 103 being designed to send a connection request to the telephone network subscriber 111 in response to receiving the control command in order to initiate the establishment of the telephone connection 109 between the emulated extension subscriber 105 and the telephone network subscriber 111, the connection request including a telephone network address of the telephone network subscriber 111 in the public telephone network 101, and said communications system comprising a telephone network abuse detection device 113, the telephone system server 103 being designed to transmit the telephone network address of the telephone network subscriber 111 to the telephone network abuse detection device 113, the telephone network abuse detection device 113 being designed to detect an abuse attempt in the public telephone network 101 on the basis of the transmitted telephone network address of the telephone network subscriber 111.

The telephone system server 103 can be connected to the public telephone network 101 as a second telephone network subscriber or as a telephone system. The telephone system server 103 can be designed to emulate the extension subscriber 105 of the telephone system 102, in particular to emulate acting as an extension subscriber 105 of a telephone system 102. In this regard, the telephone system server 103 can emulate the extension subscriber 105 and the associated telephone system 102 of the extension subscriber 105. The telephone system server 103 can emulate the telephone system 102 as a telephone system connected to the public telephone network 101. In addition, the telephone system server 103 can itself be designed as a telephone system, and can itself form the telephone system 102 of the emulated extension subscriber 105. Emulating the extension subscriber 105 and/or the telephone system 102 by the telephone system server 103 can involve the telephone system server 103 reproducing, in particular virtually reproducing, or simulating the extension subscriber 105 and/or the telephone system 102.

The telephone system server 103 can comprise or form a telephone system decoy system, a telephone system honeypot or a PBX honeypot. The telephone system server 103 can also comprise an IP telephone system, in particular a Voice over IP telephone system, or an IP PBX based on the open-source software Asterisk or different Voice over IP telephone system software. The telephone system server 103 can be connected to the internet and/or to the telephone network, and can be designed to receive control commands for establishing telephone connections 109 to telephone network subscribers in the public telephone network 101 via the internet and/or the telephone network.

The telephone system server 103 can be connected to the public telephone network 101 or a subscriber network of a telephone network operator via a subscriber connection line. The telephone system server 103 can also be connected to the public telephone network via a system connection, for example a primary multiplexer connection or a SIP trunk. The system connection of the telephone system server 103 can be designed as an "all IP connection", for example an internet connection having Voice over IP. Furthermore, the telephone system server 103 can comprise an internet connection and a separate telephone connection, for example an ISDN connection or a primary multiplexer connection, via which the outgoing telephone connections can be sent into the public network.

The telephone system server 103 can comprise a memory for storing the telephone network addresses and a processor for controlling the emulation of the extension subscriber 105. The processor can also be designed to process the control command from the attacking entity 107 and to initiate the establishment of the connection.

The attacking entity 107 can be an attacker, a hacker or a fraudster, or an entity used by an attacker, a hacker or a fraudster, for example a server or computer. The attacking entity 107 can locate the telephone system server 103 via the internet or telephone network, and can actuate said server using control commands for establishing telephone connections 109. The attacking entity 107 can also actuate the telephone system server 103 via the telephone network 101 using control commands, in particular when the telephone system server 103 comprises an ISDN connection. To do so, the attacking entity 107 for example calls the direct dial number of an extension in order to be connected to a voice mailbox. The attacking entity 107 then attempts to control the voice mailbox via the telephone line by for example inputting DTMF control commands, in order to abuse said mailbox to establish an outgoing voice call ("call-through"). The telephone system server 103 can be designed to emulate a voice mailbox on the direct dial numbers of the emulated extension 105 in order to allow the attacking entity 107 to communicate control commands via the emulated voice mailbox.

The control commands communicated by the attacking entity 107 can include an identifier of the emulated extension subscriber 105, in particular an extension number of the emulated extension subscriber 105, a password of the emulated extension subscriber 105 and the telephone network address of the telephone network subscriber 111. The control commands can further comprise the IP address of the attacking entity 107. Alternatively, the telephone system server 103 can be designed to capture and store the IP address of the attacking entity 107.

For example, the attacking entity 107 sends a multiplicity of control commands to the telephone system server 103 in order to guess the extension number and the password of the emulated extension subscriber 105. The telephone system server 103 can be designed to emulate the emulated extension subscriber 105 using a particularly easy to guess password, such as "123456", and a particularly short or obvious extension number, in order to increase the likelihood of a successful attack, and at the same time to simulate a telephone system having surmountable security measures that is believable from the perspective of the attacking entity 107.

The telephone network address of the telephone network subscriber 111 can comprise a telephone number or a calling or destination number, or a SIP-URI of the telephone network subscriber in the public telephone network 101. The telephone number can include an area code, in particular a country code. The telephone system server 103 can be designed to only initiate the establishment of the connection when the telephone number is preceded by a code digit, e.g. "0". In order to guess the correct digit, the attacking entity 107 may thus send a multiplicity of control commands containing telephone numbers of the telephone network subscriber 111 to the telephone system server 103, each containing different preselected code digits.

The telephone network subscriber 111 is, for example, another telephone system, in particular a telephone system having an IRSF destination number, or a mobile phone. The mobile phone can be in the attacker's possession. The attacking entity 107 can send a connection request to the mobile phone as a test, in particular to test the code digits or to test whether the telephone system server permits a call to a telephone number having a foreign country code. The telephone network subscriber 111 can also be a virtual telephone network subscriber or an emulated telephone network subscriber generated, for example, by a server connected to the public telephone network 101. The telephone network address of the telephone network subscriber 111 can be a premium-rate number for which the attacker earns a revenue share.

The public telephone network 101 can comprise connections in various countries or geographic regions. For example, the telephone network subscriber 111 is connected to the public telephone network 101 in a different country from the telephone system server 103. The public telephone network 101 can also comprise a multiplicity of subscriber or interconnection networks. The telephone system server 103 is connected for example to a subscriber network of one subscriber network operator, and the telephone network subscriber 111 is for example connected to another subscriber network of a different subscriber network operator. The subscriber network and the other subscriber network can be connected via an interconnection network.

The telephony communication system 100 can be designed to detect abuse in a subscriber network of the public telephone network 101. In particular, the telephone network abuse detection device 113 can be designed to detect abuse attempts in a subscriber network of the public telephone network 101.

In the event that a telephone connection 109 is established between the emulated extension subscriber 105 and the telephone network subscriber 111, the telephone system server 103 can also be designed to capture and store traffic data of the telephone connection 109, for example a duration of the telephone connection 109.

According to an embodiment, the telephone system server 103 is designed to store the connection request, in particular the telephone network address of the telephone network subscriber 111, and/or the associated control command in a look-up table.

According to an embodiment, the telephone system server 103 is also designed to capture a network address of the attacking entity 107, in particular an IP address of the attacking entity 107, and to store said address in the look-up table. The telephone system server 103 can also be designed to store the traffic data of the telephone connection 109, for example a duration of the telephone connection 109, in the look-up table if the telephone connection 109 to the telephone network subscriber 111 is established. The look-up table can form a database and can include a multiplicity of telephone network addresses captured by the telephone system server 103 over a particular time period.

According to an embodiment, the telephone system server 103 comprises a visualization apparatus for visualizing the look-up table. The telephone system server 103 can be actuated via a computer in order to access and visualize the look-up table, for example via a data visualization plug-in such as Kibana. In the process, the look-up table can be scanned or sorted through via a search engine or a search server such as Elasticsearch.

According to an embodiment, the telephone system server 103 is designed to transmit telephone network addresses stored in the look-up table to the telephone network abuse detection device 113 on the basis of an adjustable transmission rule.

The transmission rule can establish that only telephone network addresses having foreign destination numbers are transmitted. Transmitting the telephone network addresses can involve exporting the telephone network addresses.

Figure 2:
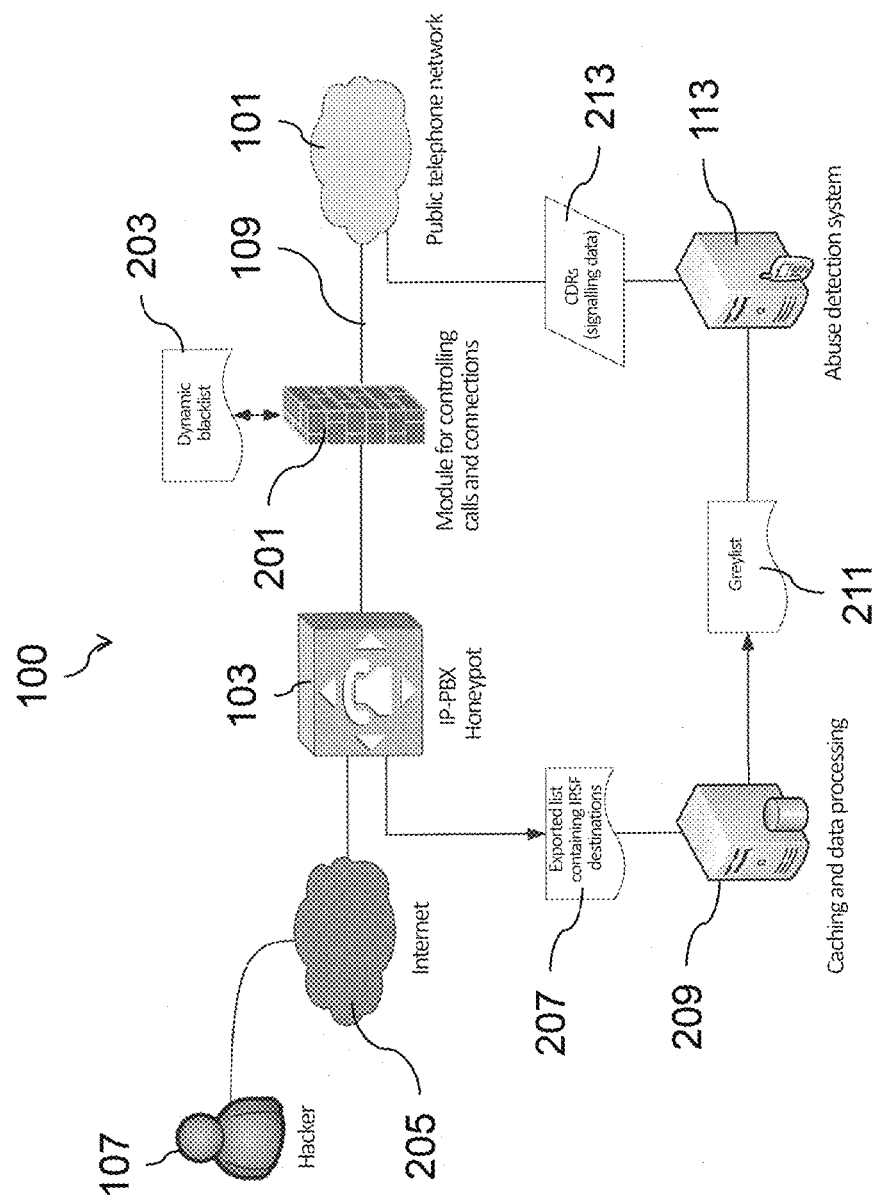
FIG. 2 is a schematic view of a telephony communications system for detecting abuse in a public telephone network according to an embodiment.

FIG. 2 is a schematic view of the telephony communications system 100 for detecting abuse in the public telephone network 101 according to another embodiment.

The telephony communications system 100 in FIG. 2 comprises a connection control device 201 that has a dynamic reference list 203 and is connected between the telephone system server 103 and the public telephone network 101, a list 207 containing IRSF destinations, exported from the telephone system server, a storage device 209, a greylist 211 used by the telephone network abuse detection device 113, and signaling data 213 that are analyzed by the telephone network abuse detection device 113.

Furthermore, the telephony communications system 100 in FIG. 2 shows the access that the attacking entity 107 has to the telephone system server 103 via the internet 205.

The connection control device 201 can be designed to receive the connection request from the telephone system server 103 and to relay said request to the telephone network subscriber 111 in the public telephone network 101 in order to establish the telephone connection 109.

The connection control device 201 can comprise a Voice over IP gateway and/or a SIP proxy, in particular a SIP proxy server. The connection control device can connect the telephone system server 103 to the public telephone network 101. The connection control device 201 can be designed as a module for controlling calls and connections The connection control device 201 can comprise a dynamic reference list 203 or can be designed to access a dynamic reference list 203, the dynamic reference list 203 comprising telephone network addresses of telephone network subscribers in the public telephone network 101, in particular of those that have already been used by attacking entities 107 in the past. The dynamic reference list 203 can form a dynamic blacklist of the connection control device 201.

The connection control device 201 can be designed to compare the telephone network address of the telephone network subscriber 111 with telephone network addresses in the dynamic reference list 203 or blacklist, before relaying the connection request. The connection control device 201 can be designed to not relay the connection request if the telephone network address is already included in the dynamic reference list 203. This can ensure that a connection can only be established to not yet known telephone network subscribers. The attacking entity may thus be prompted to send control commands for establishing connections to as yet unknown telephone network subscribers, thus making it possible to capture efficiently as many telephone network addresses as possible of unknown telephone network subscribers used by the attacking entity 107.

According to an embodiment, the connection control device 201 is designed to store the telephone network address of the telephone network subscriber 111 in the dynamic reference list 203 after relaying the connection request.

According to another embodiment, the connection control device 201 is designed to break the established telephone connection 109 between the emulated extension subscriber 105 and the telephone network subscriber 111 after a predefined period of time. The connection control device 201 thus ensures that no long telephone connections 109 to IRSF destination numbers, in particular international IRSF destination numbers, can be established. This can prevent high costs.

To be able to prevent multiple dials to the same telephone network address, in particular phone numbers, in the public telephone network 101, the following simple rules can be implemented in the connection control device 201:

1. If a number is dialed for the first time (the number is not yet included in the blacklist 203), the call is permitted or the connection allowed to be established.
2. If a telephone connection 109 to a dialed number is established (the person called or the telephone network subscriber 111 accepts the connection), the new number is stored in the dynamic blacklist 203.
3. If a telephone connection 109 is established to a number, the connection is after a predefined period of time (limiting the duration of the connection to minimize costs).
4. If a number is repeatedly dialed after a telephone connection 109 has been established (the dialed number is already contained in the dynamic blacklist 203), the call is not permitted (i.e. the connection control device 201 does not put the desired connection through to the public telephone network 101).

By breaking existing telephone connections 109 after a short connection time, and by preventing repeated dialing, inactive IRSF destination numbers and network blocks can be simulated. As a result, the attacking entity 107 may be motivated to always dial new IRSF destination numbers. The telephone system server 103 can thus record a maximum number of IRSF destination numbers used.

In FIG. 2, the storage device 209 is connected between the telephone system server 103 and the telephone network abuse detection device 113.

The storage device 209 can be designed to receive a list 207 of the collected telephone network addresses from the telephone system server 103, to cache this list in a database for the purpose of data processing, and to send the cached telephone network addresses to the telephone network abuse detection device 113 following the data processing. In the process, time stamps showing the times at which said telephone network addresses were recorded are in particular also stored. The time stamp can also indicate the time at which the connection request associated with the telephone network address was sent.

The list 207 can comprise at least some of the look-up table stored in the telephone system server 103; in particular the list 207 can comprise at least some of the telephone network addresses stored in the look-up table.

The storage device 209 can thus form a cache in the telephony communications system 100 for the purpose of data processing and management. For this purpose, the storage device 209 can comprise a memory, in particular a server memory or a network memory, in which the list or database is stored.

Usually attacking entities 107, such as telephone system hackers or equipment used thereby, regularly renew the numbers they abuse to generate termination charges, so most new numbers are no longer used after a few months. In the storage device 209, therefore, obsolete entries can be deleted after a certain period of time. The time limit for deletion for obsolete numbers can be configurable and adjustable.

The storage device 209 can be designed to generate a greylist 211 at regular intervals, for example daily. The greylist 211 contains, for example, all the IRSF destination numbers currently used by attacking entities 107 for generating termination charges and recorded by the telephone system server 103, in a canonical format (e.g. according to ITU-T Recommendation E.123).

The storage device 209 can ensure that the greylist 211 does not contain any duplicate numbers, for example in different notation. The numbers recorded in the PBX honeypot can first be canonized, i.e. changed to a uniform format, and then duplicated and old entries erased therefrom.

Preferably, the cache can have other functions, such as combining consecutive phone numbers to form phone number lanes. In doing so, the following algorithm can be used, the phone numbers R corresponding to the telephone network addresses: (i) Sort all phone numbers R in the cache in ascending order. (ii) If, in the sorted list, there is a sub-list $R_{1,n}, \ldots, R_{m,n}$ having m digit sequences (numbers) of length n, of which the first n−1 digits are the same, these are collated to form a single digit sequence $R_{x,n-1}$ of length n−1 (number lane). (iii) Repeat the last step until this condition is no longer met.

The parameter m makes it possible to control how many different phone numbers with a different final digit there must be before they are collated to form a lane (without the final digit), for example four or five phone numbers.

The storage device 209 can be designed to transmit the collated telephone network addresses, in particular the phone number lanes, to the telephone network abuse detection device 113, in particular in the form of the greylist 211.

By combining the phone numbers to form phone number lanes, the length of the greylist 211 can be further shortened.

The telephone network abuse detection device 113 in FIG. 2 can comprise a memory, in particular a server memory or a network memory. The telephone network addresses, in particular the greylist, transmitted by the telephone system server 103 or the storage device 209 can be stored in the memory.

The telephone network abuse detection device 113 can form an abuse detection system that processes connection datasets (CDRs, call detail records) from the public telephone network 101, in particular from a subscriber network of the public telephone network 101. In this case, not only can the datasets from successful connections be processed, but so too can the datasets from dialing attempts, i.e. signaling data 213, in which no connection was established, for example because the destination number was blocked or the person called did not answer.

The telephone network abuse detection device 113 or the abuse detection system can be designed to receive signaling data 213 from other telephone network subscribers in the public telephone network 101, the signaling data 213 including telephone network addresses from connection requests. The telephone network abuse detection device 113 can also be designed to compare the telephone network addresses in the signaling data 213 with telephone network addresses stored in the greylist 211, in order to detect connection requests from the other telephone network subscribers to telephone network subscribers having telephone network addresses stored in the greylist 211. For this purpose, the greylist 211 can be imported into the telephone network abuse detection device 113 or the abuse detection system.

According to an embodiment, the telephone network abuse detection device 113 is designed to emit an alert signal on the basis of a filter rule upon detection of connection requests to telephone network subscribers whose telephone network addresses are stored in the greylist 211, in particular to the telephone network operator or the telephone network subscriber that sends the corresponding connection request(s), or to both.

The telephone network abuse detection device 113 can be designed to emit an alert signal when it detects abuse on the basis of the filter rule.

In practice, however, one or more telephone network addresses on the greylist 211 may be dialed by a connection of a subscriber in the public telephone network 101, for example because the telephone network subscriber dials an international number also used by an attacking entity 107 (number hijacking), or because the telephone network subscriber misdialed. However, if many different destination numbers, including in different countries, that have been detected previously in the telephone system as IRSF destination numbers are dialed over a short period of time by a connection of a telephone network subscriber, it is highly likely that an attacking entity 107 is controlling a telephone system at the connection concerned, in particular to abuse or prepare to abuse the network.

For this reason, a filter rule can be set up in the telephone network abuse detection device 113, in order to distinguish between attacks on telephone systems and normal usage of the telephone systems at the connections. The filter rule can reduce the risk of erroneous emission of the alert message.

Preferably, the filter rule is defined as follows: An alert signal is only sent to the telephone network operator or a telephone network subscriber if (i) 20 attempts to dial destination numbers on the greylist 211 are made within four hours, (ii) at least four different destination numbers on the greylist 211 are dialed, and (iii) destination numbers on the greylist 211 in at least three different destination countries are dialed.

The alert signal can include an abuse alert sent to the telephone network subscriber sending the connection requests to terminals used by attackers. The alert message can include sending a message, in particular a voice message or an SMS, to a stored telephone number of the subscriber, and/or sending an email to a stored email address of the telephone network subscriber.

In addition, upon detection of an attack on a telephone system, further counter-measures can be taken, such as a foreign block for the connection affected.

Often, the attacking entity 107 will first dial a test number before beginning to call the IRSF destination numbers. Via the test number, the attacking entity 107 can test which dialing prefix has to be pre-selected for the telephone system in question in order to obtain an "exchange" and establish an international connection.

Usually, international mobile numbers are used, in particular from prepaid Subscriber Identity Module (SIM) cards. If the attacker's mobile phone receives a call from the hacked telephone system, then the attacking entity 107 has found the correct dialing prefix.

Therefore, another design of the invention involves importing these test numbers dialed before the actual IRSF destinations into a separate list, and thus generating a corresponding alarm filter that triggers an alarm as early as when known test numbers are dialed by telephone systems.

Preferably, the two lists, in particular the greylist 211 and the separate list, and filter rules based on the lists, are combined to prevent false alarms. A filter rule for the test numbers can be used to generate a pre-alarm and a filter rule for the IRSF destinations can be used to generate a main alarm.

To detect a hacked telephone system and inform the subscriber as early as possible, the alarm can, according to an embodiment, only be generated on the basis of the test numbers.

Figure 3:
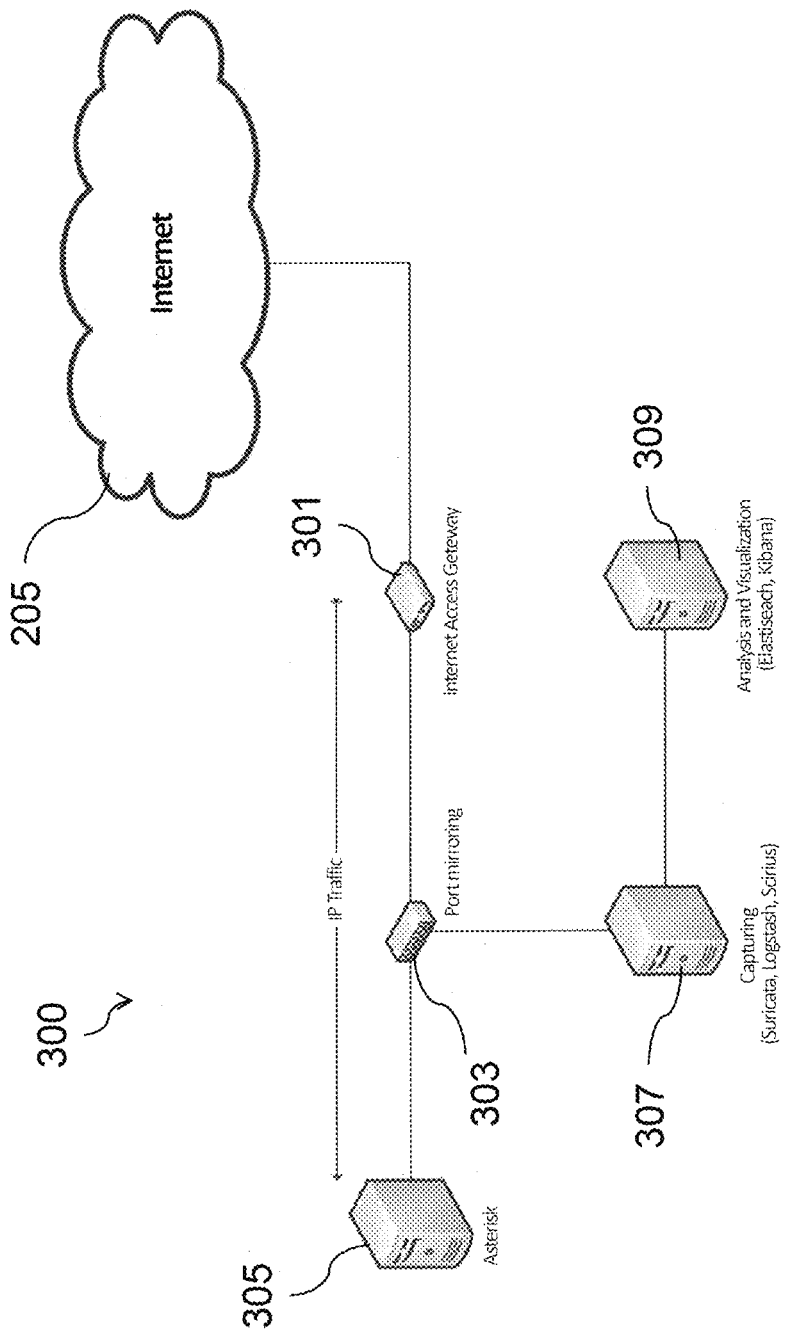
FIG. 3 is a schematic view of a telephone system server according to an embodiment.

FIG. 3 is a schematic view of the telephone system server 300 according to an embodiment. The telephone system server 103 in FIGS. 1 and 2 can be designed according to the embodiment of the telephone system server 300 in FIG. 3.

The telephone system server 300 in FIG. 3 comprises a communications interface 301, a network switch 303, a controller 305, a capturing apparatus 307 and an analysis and visualization apparatus 309. According to an embodiment, the telephone system server 300 forms a honeypot system or a PBX honeypot.

The telephone system server 300 can be connectable to the internet 205 via the communications interface 301. The communications interface 301 can comprise an internet access gateway.

The telephone system server 300 can be designed to receive control commands for establishing telephone connections between an extension subscriber emulated by the controller 305 and a terminal in the public telephone network via the communications interface 301.

The controller 305 can form a telephone system, in particular a Voice over IP telephone system. For this purpose, the open-source software Asterisk can be used in particular. The controller 305 can form the PBX honeypot at the same time. The capturing apparatus 307 and the analysis and visualization apparatus 309 can be integrated via the network switch 307, which is designed in particular as a port mirroring apparatus.

The capturing apparatus 307 can capture incoming control commands from attacking entities 107 in the data traffic between the internet 205 and the controller 305. For this purpose, the capturing apparatus 307 can use attack detection software such as Suricata, data collection and relaying software such as Logstash, and a web interface such as Scirius. Thus, via the capturing apparatus 307 attacks by the attacking entity 107 can be recorded to the controller 305. The capturing apparatus can store the attacks in a look-up table.

Via the analysis and visualization apparatus 309, the collected data, in particular the data stored in the look-up table, can be visualized. For this purpose, the analysis and visualization apparatus 309 can comprise a data visualization plug-in such as Kibana. The look-up table can be scanned or sorted through via a search engine or a search server such as Elasticsearch.

For example, the telephone system server or the analysis and visualization apparatus 309 can be actuated via a computer in order to access and visualize the look-up table.

Attacking entities 107 such as telephone hackers or devices used thereby can find the honeypot IP PBX on the internet and begin their attacking attempts. In the process, they attempt, for example, to guess extension numbers used and associated passwords or to determine them using known attacking methods such as dictionary attacks, and attempt to establish connections to international numbers.

The attacks can be recorded in the capturing apparatus 307 and can be analyzed in the analysis and visualization apparatus 309. In particular, all the international numbers dialed by the attacking entities 107 can be analyzed and exported.

Figure 4:
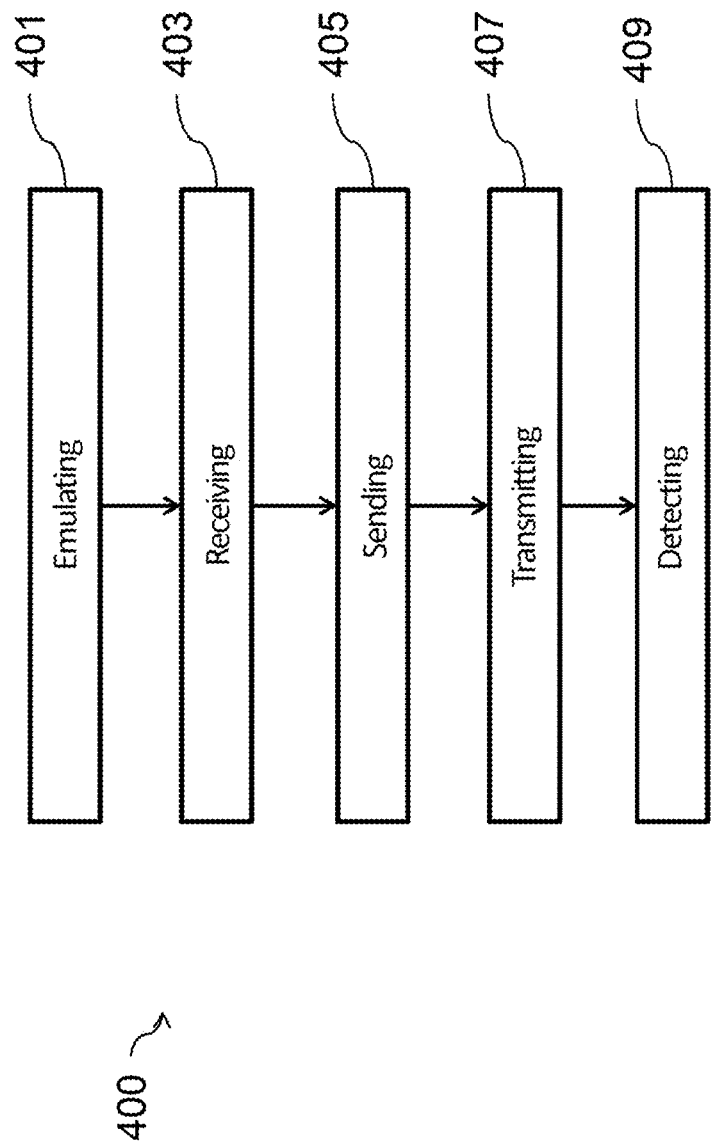
FIG. 4 is a flowchart of a method for detecting abuse in a public telephone network according to an embodiment.

FIG. 4 is a flow chart of a method 400 for detecting abuse in the public telephone network 101 to which the telephone network subscriber 111 is connected, according to an embodiment.

The method 400 comprises emulating 401 an extension subscriber 105 of a telephone system 102 in the public telephone network 101 having a telephone system server 103 connected to the public telephone network 101, in order to simulate the existence of the emulated extension subscriber 105 vis-à-vis an attacking entity 107, receiving 403 a control command from the attacking entity 107 for establishing the telephone connection 109 between the emulated extension subscriber 105 and the telephone network subscriber 111 in the public telephone network 101, sending 405 a connection request to the telephone network subscriber 111 in response to receiving the control command in order to initiate the establishment of the telephone connection 109 between the emulated extension subscriber 105 and the telephone network subscriber 111, the connection request including a telephone network address of the telephone network subscriber 111, transmitting 407 the telephone network address of the telephone network subscriber 111 to a telephone network abuse detection device 113, and detecting 409 an abuse attempt in the public telephone network 101, in particular in a subscriber network of the public telephone network, on the basis of the transmitted telephone network address of the telephone network subscriber 111.

The attacking entity 107 will usually attempt to systematically dial an extensive list of international destination numbers, for example to use IRSF. The dialed numbers are often not limited to a particular country or geographically limited to a particular area of the world, but are often distributed over various countries and regions. Some of these numbers have for example already been abused previously and may therefore have already been blocked in the past.

The numbers are for example dialed systematically by the hacked telephone system every minute in an automated manner using a list, until the attacking entity 107 finds a number to which a significantly long telephone connection is established. After this has been recorded by the attacking entity 107, it usually dials these numbers multiple times, for example more than one hundred times, for a connection duration of for example 20 to 30 minutes.

It takes the attacking entity 107 two hours, for example, to test the different international destination numbers until a promising number is found. However, this period is not used by conventional abuse detection systems to detect the abuse, since the dialing attempts to blocked number lanes or the short connections to inactive IRSF destinations are not normally recorded, or the total duration of the connections is still far below the thresholds set. It is not until after the attacking entity 107 has called a number many times in succession for a connection duration of significant length that the threshold is reached by conventional abuse detection systems and an abuse alarm triggered thereby.

The present telephony communications system 100 takes advantage of this observation of the attack patterns. The destination numbers observed can be stored in a greylist 211 in the telephone system server 103 used or in the telephone network abuse detection device 113, such that certain actions can be triggered when a number from this list is dialed.

In this case, a greylist 211 contains, for example, as extensive a list as possible of numbers currently being used by telephone hackers for generating IRSF termination charges. As soon as the telephone network abuse detection device 113 registers dialing attempts from a telephone system connection to a plurality of these numbers, which can also be blocked on the network, an abuse alarm can be triggered.

The advantage of this approach is that a hacked telephone system at a (telephone system) connection can be detected as early as during the (unsuccessful) attempts by the attacker 107 to dial respective, blocked destination numbers. The abuse alarm can thus be triggered sooner and countermeasures taken earlier.

It goes without saying that the features of the various embodiments described herein by way of example can be combined with one another, unless specifically stated otherwise. As indicated in the description and drawings, individual elements described as being connected to one another need not be directly interconnected; intermediate elements may be provided between the connected elements. It also goes without saying that embodiments of the invention can be implemented in individual circuits, partially integrated circuits or fully integrated circuits, or programming. The term "for example" is merely meant to indicate an example, not the best or optimum option. Particular embodiments have been illustrated and described here, but it is obvious for a person skilled in the art that a number of alternatives and/or equivalent implementations can be realized in place of the embodiments shown and described, without departing from the concept behind the present invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 100 telephony communications system
101 public telephone network
102 emulated telephone system
103 telephone system server
105 emulated extension subscriber
107 attacking entity
109 telephone connection
111 telephone network subscriber
113 telephone network abuse detection device
201 connection control device
203 dynamic reference list
205 internet
207 list
209 storage device
211 greylist
213 signaling data
300 telephone system server
301 communications interface
303 network switch
305 controller
307 capturing apparatus
309 analysis and visualization apparatus
400 method for detecting abuse in a public telephone network
401 emulating
403 receiving
405 sending
407 transmitting
409 detecting

The invention claimed is:

1. A telephony communications system for detecting abuse in a public telephone network to which a telephone network subscriber is connected, comprising:
a telephone system server, configured to:
emulate an extension subscriber of a telephone system in the public telephone network in order to simulate the existence of the emulated extension subscriber of the telephone system with respect to an attacking entity,
receive a control command from the attacking entity to establish a telephone connection between the emulated extension subscriber and the telephone network subscriber in the public telephone network,
send a connection request to the telephone network subscriber in response to receiving the control command from the attacking entity in order to initiate the establishment of the telephone connection between the emulated extension subscriber and the telephone network subscriber, wherein the connection request includes a telephone network address of the telephone network subscriber in the public telephone network, and
send the telephone network address of the telephone network subscriber of the connection request to a telephone network abuse detection device; and
the telephone network abuse detection device, configured to receive the telephone network address of the telephone network subscriber of the connection request from the telephone system server, and to detect an abuse attempt in the public telephone network on the basis of the telephone network address of the telephone network subscriber of the connection request.

2. The telephony communications system according to claim 1, further comprising:
a connection control device, wherein the connection control device is connected between the telephone system server and the public telephone network, wherein the connection control device is configured to receive the connection request of the telephone system server and to relay said request to the telephone network subscriber in the public telephone network in order to establish the telephone connection.

3. The telephony communications system according to claim 1, wherein the connection control device is configured to compare the telephone network address of the telephone network subscriber with telephone network addresses in a dynamic reference list before relaying the connection request.

4. The telephony communications system according to claim 3, wherein the connection control device is configured to store the telephone network address of the telephone network subscriber in the dynamic reference list after relaying the connection request.

5. The telephony communications system according to claim 3, wherein the connection control device is configured to break the established telephone connection between the emulated extension subscriber and the telephone network subscriber after a predefined period of time.

6. The telephony communications system according to claim 1, wherein the telephone system server is configured to store the connection request and/or the associated control command in a look-up table.

7. The telephony communications system according to claim 6, wherein the telephone system server comprises a visualization apparatus for visualizing the look-up table.

8. The telephony communications system according to claim 6, wherein the telephone system server is configured to send the telephone network address of the telephone network subscriber, stored in the look-up table to the telephone network abuse detection device, on the basis of an adjustable transmission rule.

9. The telephony communications system according to claim 1, wherein the telephone network abuse detection device comprises a memory for storing the telephone network address of the telephone network subscriber, in particular in a greylist stored in the memory.

10. The telephony communications system according to claim 9, wherein the telephone network abuse detection device is configured to process signaling data from other telephone network subscribers in the public telephone network, wherein the signaling data comprise telephone network addresses of connection requests from the other telephone network subscribers, wherein the telephone network abuse detection device is configured to compare the telephone network addresses in the signaling data with telephone network addresses stored in the memory in order to detect connection requests from the other telephone subscribers in the public telephone network to telephone network subscribers whose telephone network addresses are stored in the memory.

11. The telephony communications system according to claim 10, wherein the telephone network abuse detection device is configured to emit an alert signal on the basis of a filter rule upon detection of connection requests from the other telephone network subscribers in the public telephone network to telephone network subscribers whose telephone network addresses are stored in the memory.

12. The telephony communications system according to claim 11, wherein the filter rule includes a plurality of conditions including detecting a predefined number of connection requests to one or more telephone network subscribers whose telephone network addresses are stored in the memory, and detecting connection requests to a predefined number of different telephone network subscribers whose telephone network addresses are stored in the memory, wherein the telephone network abuse detection device is configured to emit the alert signal in response to a plurality of filter rule conditions being met by another telephone network subscriber in the public telephone network.

13. The telephony communications system according to claim 1, wherein the telephony communications system comprises a storage device connected between the telephone system server and the telephone network abuse detection device, wherein the storage device is configured to cache the telephone network address of the telephone network subscriber in order to process the data in a database before sending it to the telephone network abuse detection device.

14. The telephony communications system according to claim 13, wherein the storage device is configured to collate telephone network addresses cached in the database in relation to a digit sequence of the telephone network addresses, and to send the collated telephone network addresses to the telephone network abuse detection device, in particular in the form of the greylist.

15. The telephony communications system according to claim 13, wherein the storage device is configured to send telephone network addresses cached in the database to the telephone network abuse detection device at regular intervals, and to delete the telephone network addresses from the database after a predefined period of time.

16. A method for detecting abuse in a public telephone network to which a telephone network subscriber is connected, comprising:
  emulating, by a telephone system server, an extension subscriber of a telephone system in the public telephone network having a telephone system server in order to simulate the existence of the emulated extension subscriber of the telephone system with respect to an attacking entity;
  receiving, by the telephone system server, a control command from the attacking entity for establishing a telephone connection between the emulated extension subscriber and the telephone network subscriber in the public telephone network;
  sending, by the telephone system server, a connection request to the telephone network subscriber in response to receiving the control command from the attacking entity in order to initiate the establishment of the telephone connection between the emulated extension subscriber and the telephone network subscriber, wherein the connection request includes a telephone network address of the telephone network subscriber;
  sending, by the telephone system server, the telephone network address of the telephone network subscriber of the connection request to a telephone network abuse detection device; and
  detecting, by the telephone network abuse detection device, an abuse attempt in the public telephone network on the basis of the telephone network address of the telephone network subscriber of the connection request.

* * * * *